United States Patent
Wu et al.

(10) Patent No.: US 10,142,629 B2
(45) Date of Patent: Nov. 27, 2018

(54) METHOD AND APPARATUS FOR ENTROPY CODING IN IMAGE COMPRESSION

(71) Applicant: MEDIATEK INC., Hsin-Chu (TW)

(72) Inventors: Tung-Hsing Wu, Chiayi (TW);
Li-Heng Chen, Tainan (TW);
Han-Liang Chou, Baoshan Township, Hsinchu County (TW)

(73) Assignee: MEDIATEK INC., Hsin-Chu (TW)

( * ) Notice: Subject to any disclaimer, the term of this patent is extended or adjusted under 35 U.S.C. 154(b) by 152 days.

(21) Appl. No.: 15/386,022

(22) Filed: Dec. 21, 2016

(65) Prior Publication Data

US 2017/0188026 A1 Jun. 29, 2017

Related U.S. Application Data

(60) Provisional application No. 62/271,494, filed on Dec. 28, 2015.

(51) Int. Cl.
| | |
|---|---|
| *H04N 19/112* | (2014.01) |
| *H04N 7/12* | (2006.01) |
| *H04N 19/184* | (2014.01) |
| *H04N 19/13* | (2014.01) |
| *H04N 19/44* | (2014.01) |
| *H04N 19/136* | (2014.01) |

(52) U.S. Cl.
CPC .......... *H04N 19/112* (2014.11); *H04N 19/13* (2014.11); *H04N 19/136* (2014.11); *H04N 19/184* (2014.11); *H04N 19/44* (2014.11)

(58) Field of Classification Search
CPC .... H04N 19/13; H04N 19/112; H04N 19/184; H04N 19/136
See application file for complete search history.

(56) References Cited

U.S. PATENT DOCUMENTS

| | | | | |
|---|---|---|---|---|
| 7,015,837 B1 * | 3/2006 | Malvar | ................... | H03M 7/46 341/50 |
| 7,068,192 B1 * | 6/2006 | Dean | ....................... | H03M 7/40 341/67 |
| 8,724,709 B2 * | 5/2014 | Boehm | ................... | H03M 7/40 375/240.25 |
| 8,780,980 B2 * | 7/2014 | Yamaguchi | ............. | H03M 7/42 375/240.03 |

(Continued)

*Primary Examiner* — Tsion B Owens
(74) *Attorney, Agent, or Firm* — McClure, Qualey & Rodack, LLP

(57) ABSTRACT

A method and apparatus of image coding including adaptive entropy coding are disclosed. According to this method, input pixels associated with a group of symbols generated from image or video data are received. Maximum bit-depth of the group of symbols is then determined. If the maximum bit-depth of the group of symbols is smaller than a first bit-depth threshold, the group of symbols is encoded or decoded using Golomb-Rice coding. If the maximum bit-depth of the group of symbols is greater than or equal to the first bit-depth threshold, the group of symbols is encoded or decoded using second entropy coding, where the second entropy coding is different from the Golomb-Rice coding. Outputs corresponding to encoded or decoded output associated with the group of symbols are provided. The maximum bit-depth of the group of symbols is signaled at the encoder or recovered at the decoder by parsing the bitstream.

25 Claims, 6 Drawing Sheets

(56) References Cited

U.S. PATENT DOCUMENTS

| | | | |
|---|---|---|---|
| 2006/0273937 A1* | 12/2006 | Ishikawa | H03M 7/40 341/50 |
| 2007/0171985 A1* | 7/2007 | Kim | H04N 19/176 375/240.26 |
| 2008/0253460 A1* | 10/2008 | Lin | H03M 7/40 375/240.23 |
| 2009/0097768 A1* | 4/2009 | Seregin | H04N 19/176 382/248 |
| 2010/0150242 A1* | 6/2010 | Ozawa | H04N 19/176 375/240.16 |
| 2013/0188729 A1* | 7/2013 | Lou | H04N 19/91 375/240.18 |
| 2015/0139299 A1* | 5/2015 | Seregin | H04N 19/91 375/240.02 |
| 2015/0264362 A1* | 9/2015 | Joshi | H04N 19/18 375/240.18 |
| 2016/0227254 A1* | 8/2016 | Karczewicz | H04N 19/70 |

\* cited by examiner

Related Art

METHOD AND APPARATUS FOR ENTROPY CODING IN IMAGE COMPRESSION

CROSS REFERENCE TO RELATED APPLICATIONS

The present invention claims priority to U.S. Provisional patent application, Ser. No. 62/271,494, filed on Dec. 28, 2015. The U.S. Provisional patent application is hereby incorporated by reference in its entirety.

FIELD OF THE INVENTION

The present invention relates to entropy coding for image coding systems. In particular, the present invention relates to method and apparatus for adaptive entropy coding a group of symbols, where the adaptive entropy coding determines a suffix bit-depth for coding the symbols and selects two different entropy coding types according to whether the suffix bit-depth is smaller than a bit-depth threshold.

BACKGROUND AND RELATED ART

Various video coding standards have been developed to reduce the required bitrate for video transmission or the required capacity for storage. For example, MPEG-2, MPEG-4 and AVC/H.264 have been widely used in various applications. In recent years, the coding efficiency has been substantially improved in newer video compression formats such as VP8, VP9 and the emerging HEVC (High Efficiency Video Coding) standards.

In various devices that involve image display, there is another type of application that requires data compression. In particular, display links connecting computers to monitors, set-top boxes to televisions, and application processors to display panels are digital interface formats widely used in the industry. Display links use digital interfaces. With the increasing demand for higher display resolutions and higher frame rates, the amount of data sent over display links becomes extremely high. For example, the display link between a set-box device and a 1080p HDTV at 120 Hz frame rate will require more than 7 Gbits/sec. For UHD (Ultra High Definition) TV, the required data will be four-fold higher. Therefore, display links are often in compressed formats. For example, DSC (Display Stream Compression) standard has been developed jointly by VESA (Video Electronics Standards Association) and MIPI Alliance to address the needs for data compression in display applications.

Due to different requirements, the DSC standard is different from popular video coding standards, such as MPEG-2/4, AVC/H.264 and HEVC. For example, the color space used for compression in display applications may be the YCoCg color space, instead of the YUV color space. Furthermore, DSC only includes Intra-frame compression without Inter-frame compression to minimize the processing delay and avoid the need for reference picture buffer. In typical applications, the compression ratios required for DSC is much smaller those for video storage or network delivery. FIG. 1A illustrates major functional blocks of an exemplary DSC encoder. As shown in FIG. 1A, the DSC encoder includes a source buffer 110, a predictor/quantization/reconstruction unit 112, a VLC entropy coding unit 114, a flatness determination unit 116, a rate control unit 118, a line buffer 120, and an indexed color history (ICH) unit 122. If the input image data are in the RGB color format, a color-space converter (not shown in FIG. 1A) corresponds to a RGB-to-YCoCg color format converter is utilized in the DSC encoder. The information from the flatness determination unit 116 can be used to adjust the QP (quantization parameter) in the rate control unit 118. As shown in FIG. 1A, the flatness indication is entropy coded using the VLC entropy coding unit 114 and incorporated in the bitstream. According to DSC, the pixels are processed using a 1×3 block size as shown on FIG. 1B, where a current block 130 is predicted by a reference block 132 in the same pixel row. The location of the reference block 132 is indicated by a corresponding block vector 134.

Upon the growing needs for display links to support higher display resolutions and higher bit depth for color components, VESA initiated development efforts to establish a standard for Advanced Display Stream Compression (ADSC). Also, the ADSC supports native 4:2:0 and 4:2:2 coding to eliminate the need for converting pixels into RGB components. For example, ADSC allows more efficient compression in YCbCr 4:2:0 color sampling format. In addition, ADSC also supports High Dynamic Range (HDR) to accommodate the higher color depth in newer TV shows and movies.

The processing for display links often uses block-based compression, where a picture is divided into blocks and the compression is applied to each block. Furthermore, the compression settings may be applied to an image unit smaller than a picture. For example, Advanced DSC (ADSC) being developed is applied to slices of each picture and the target bitrate is imposed on each slice. Each slice is divided into coding units (i.e., blocks) and each coding unit consists of a block of N×M pixels, where N corresponds to block width and M corresponds to block height. According to ADSC, the characteristics of each block are evaluated in terms of "flatness", where the flatness of each block is categorized into five flatness types as follows:

Type: −1 denotes the "complex block"
Type: 0 denotes the "flat region"
Type: 1 denotes the "flat region (less flat than type 1)"
Type: 2 denotes the "complex to flat block"
Type: 3 denotes the "flat to complex block"

The flatness type is determined according to the complexity information of each block and its neighboring block. Flatness type influences the rate control behavior in each block. According to the existing ADSC draft standard, the syntax of flatness type is signaled in each coding unit.

It is desirable to further improve the compression efficiency of the ADSC. In particular, the present invention addresses performance improvement for the block prediction mode.

BRIEF SUMMARY OF THE INVENTION

A method and apparatus of image coding including adaptive entropy coding are disclosed. According to this method, input pixels associated with a group of symbols generated from image or video data are received. Maximum bit-depth of the group of symbols is then determined. If the maximum bit-depth of the group of symbols is smaller than a first bit-depth threshold, the group of symbols is encoded or decoded using Golomb-Rice coding. If the maximum bit-depth of the group of symbols is greater than or equal to the first bit-depth threshold, the group of symbols is encoded or decoded using second entropy coding, where the second entropy coding is different from the Golomb-Rice coding. Outputs corresponding to encoded or decoded output associated with the group of symbols are provided. The maximum bit-depth of the group of symbols is signaled at the encoder so that the information can be recovered at the decoder by parsing the bitstream.

When the Golomb-Rice coding is selected, the Golomb-Rice coding encodes a given symbol into a prefix part and a suffix part at the encoder or decodes the prefix part and the suffix part into the given symbol at the decoder. The suffix part consists of K bits and K is an integer greater than or equal to zero. The prefix bit-length of the prefix part is smaller than or equal to a second bit-depth threshold in order to manage the complexity for encoding or decoding the prefix part. Information related to the first bit-depth threshold and the second bit-depth threshold can be signaled in high-level syntax of a bitstream related to the group of symbols. For example, the high-level syntax corresponds to PPS (Picture Parameter Set). The second bit-depth threshold may correspond to a maximum allowed Prefix bit-length and a smaller second bit-depth threshold may be selected at the encoder to reduce coding complexity. Parameter K can be determined at the encoder using an optimization process to select a best parameter K to achieve minimum coded bit-length for the group of symbols and the best parameter K is constrained to be smaller than or equal to the first bit-depth threshold. The Golomb-Rice coding may use a sign bit in addition to the prefix part and the suffix part for signed symbols.

When the Golomb-Rice coding is used, prefix parts and suffix parts for the group of symbols can be concatenated into a bitstream, where the prefix parts and the suffix parts for the group of symbols are interleaved in a bitstream. Alternatively, prefix parts for the group of symbols and suffix parts for the group of symbols are grouped separately into a bitstream.

The second entropy coding may correspond to maximum bit-length coding, where the maximum bit-length coding encodes a given symbol into a suffix data at the maximum bit-length without prefix data or decodes the suffix data at the maximum bit-length without the prefix data into the given symbol. The maximum bit-length coding may represent a positive symbol value of the given symbol as a binary number having the maximum bit-length. The maximum bit-length coding may also represent a negative symbol value of the given symbol as a 2's complement binary number having the maximum bit-length. The first bit-depth threshold can be set to zero to force the group of symbols to be coded using the second entropy coding.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

In most image and video coding systems, the source pixels are processed to remove or reduce redundancy so that the processed source pixels are more suited for efficient transmission or storage. For example, the source pixels may be subject to prediction process, transform process or a combination to generate prediction residuals or transform coefficients. A quantization process may also be further applied to the prediction residuals or transform coefficients to reduced required data representation. The processing will generate a set of processed data, such as quantized residuals or transform coefficients. The set of processed data along with along with related coding information and parameters, such as the coding mode for a block of pixels, are coded into final bitstream using entropy coding to exploit the statistical redundancy within the processed data, coding information and parameters. The processed data, coding information and parameters to be coded into the bitstream are often referred as symbols.

In the existing ADSC draft, a simple entropy coding method is used to code groups of symbols. First, the maximum bit-depth of each group of symbols is determined. Each group of symbols is then entropy coded with the maximum bit-depth. The binary strings corresponding to the entropy coded symbols along with the maximum bit-depth are signaled in the bitstream.

Figure 1A:
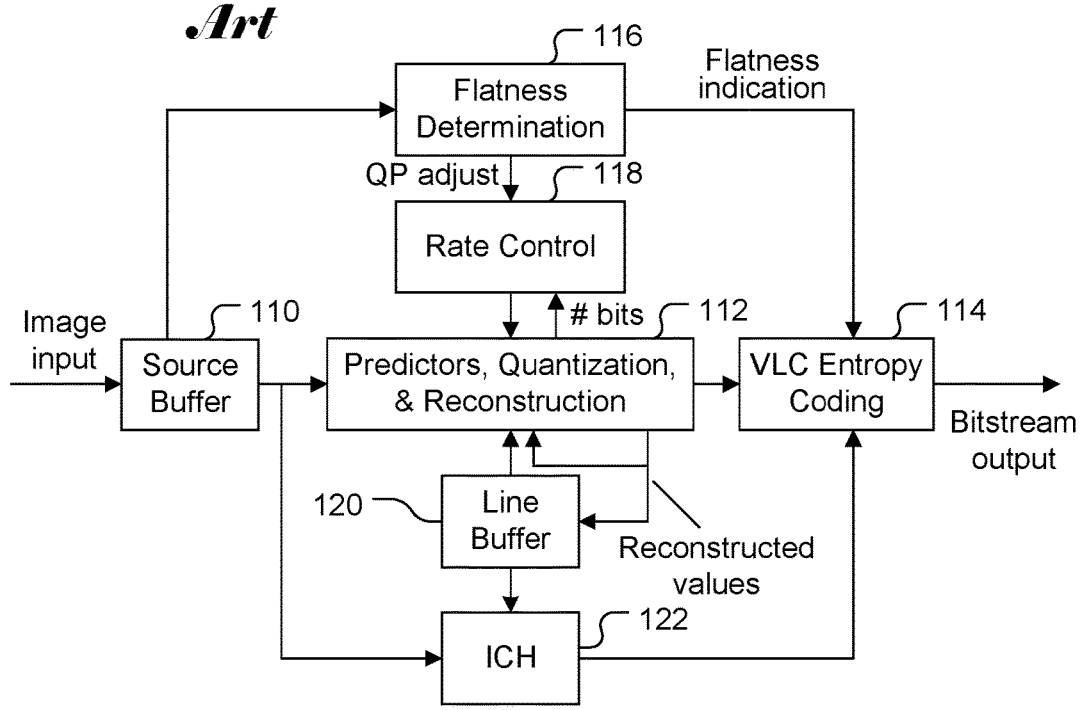
FIG. 1A illustrates major functional blocks of an exemplary system based on the Display Stream Compression (DSC) standard.
Figure 1B:
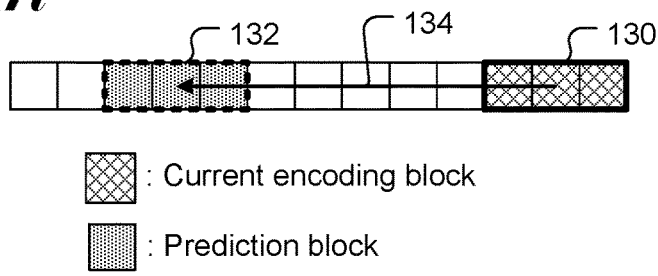
FIG. 1B illustrates an example of block prediction according to the Display Stream Compression (DSC) standard.
Figure 2A:
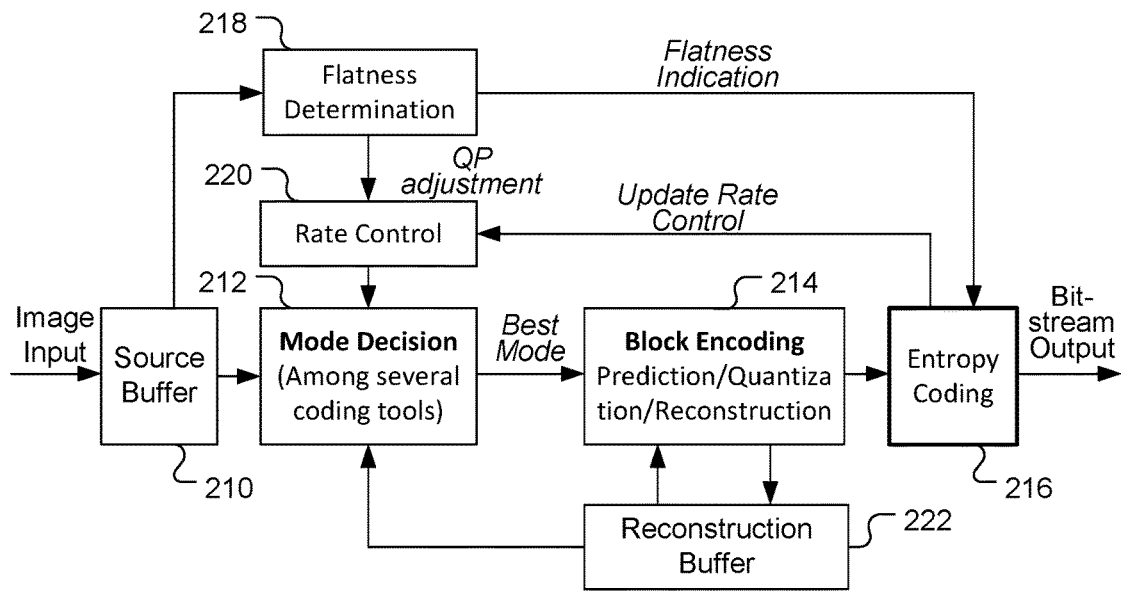
FIG. 2A illustrates major functional blocks of an exemplary system based on the Advanced Display Stream Compression (ADSC) draft.

FIG. 2A illustrates major functional blocks of an exemplary coding system according to the ADSC draft. The ADSC encoder includes a source buffer 210, a mode decision unit 212 to select a best mode for a current block being coded, a block encoding unit 214 to apply predictor, quantization and reconstruction to the current block using the best mode selected by the mode decision unit 212, a VLC entropy coding unit 216, a flatness determination unit 218, a rate control unit 220 and a reconstruction buffer 222. The reconstructed data buffered in the reconstruction buffer 222 will be used as reference data for encoding a current block and/or subsequent blocks. The reconstructed data buffered in the reconstruction buffer 222 will also be used mode decision.

According to ADSC, various coding modes are used for coding the blocks. The coding modes include Transform mode, DPCM mode, BP (block prediction) mode, Pattern mode, MPP (midpoint prediction) mode, and MPPF (MPP fallback) mode. Midpoint Prediction (MPP) mode uses a midpoint value as the predictor in each block. For example, the midpoint value can be determined by half of dynamic range of the pixels or mean value of the neighboring reconstructed pixels of the current block.

Figure 2B:
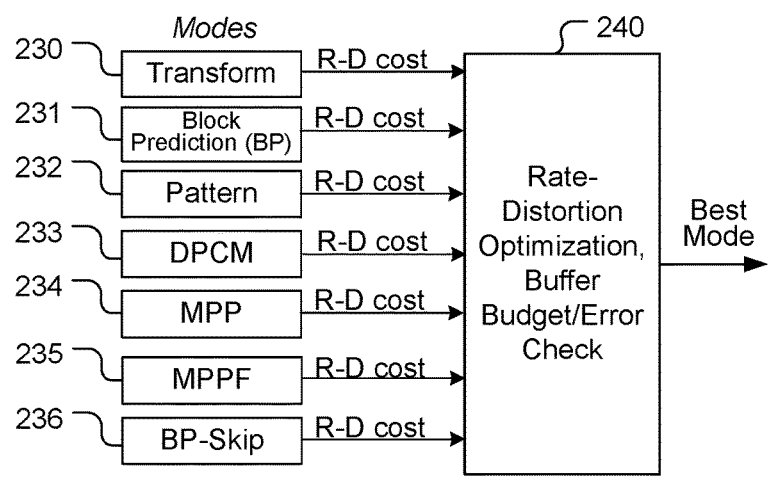
FIG. 2B illustrates mode decision process according to the Advanced Display Stream Compression (ADSC) draft.

FIG. 2B illustrates an exemplary mode decision process according to ADSC draft. The types of modes include 7 different modes (230 to 236). For each mode, the R-D cost (rate-distortion cost) is calculated and provided to a respective processing unit (240) to perform the rate-distortion optimization, buffer budget and error check function. The processing unit 240 inspects the buffer budget for each available mode. Part of modes can be turned off by encoder/decoder configuration, and the configuration can be signaled in high level syntax such as picture parameter set (PPS). The present invention may use similar processing flow as shown in FIG. 2A and FIG. 2B. However, the entropy coding unit 216 will be incorporate embodiments of the present invention.

In the field of image and video coding, Golomb-Rice (GR) entropy coding is widely used due to its high coding efficiency. The GR coding encodes a symbol into a prefix part and a suffix part according to a selected suffix bit-depth.

The present invention discloses an adaptive entropy coding technique, which determines a maximum bit-depth of a group of symbols and adaptively selects between Golomb-Rice coding or maximum bit-depth coding according to the maximum bit-depth of the group of symbols. In particular, if the maximum bit-depth of the group of symbols is smaller than a first bit-depth threshold, the group of symbols is coded using Golomb-Rice coding. If the maximum bit-depth of the group of symbols is greater than or equal to the first bit-depth threshold, the group of symbols is coded using maximum bit-depth coding.

The entropy coding decision illustrated above is based on comparing the maximum bit-depth of the group of symbols with the first bit-depth threshold. Based on the principle of equivalence, the above process can be implemented by selecting the Golomb-Rice coding if first bit-depth threshold is smaller than or equal to (the first bit-depth threshold−1) and selecting the maximum bit-depth coding if first bit-depth threshold is greater (the first bit-depth threshold−1). Furthermore, (the first bit-depth threshold−1) may be names as a new bit-depth threshold.

When the Golomb-Rice coding is selected, the Golomb-Rice coding process comprises coding a symbol into a prefix part and a suffix part with the bit-length of prefix part less than a second bit-depth threshold. The Golomb-Rice coding will also select a suffix bit-depth, designated as K in this disclosure. A process to select a best K to achieve optimal coding efficiency will illustrates later. When the maximum bit-depth coding is selected, the maximum bit-depth coding process comprises encoding all symbols within the group with the maximum bit-depth. The maximum bit-depth coding can be viewed as a variant of Golomb-Rice coding, where the suffix data are at the maximum bit-depth of the group of symbols (i.e., K set to the maximum bit-depth of the group of symbols for the maximum bit-depth coding) and there is no prefix data.

A first example of Golomb-Rice coding is shown as follows:
Symbol value=11 (decimal value)
Suffix bit-depth K=3
Suffix of Golomb-Rice code=Symbol value % $2^K$=3→coded as 011 (a binary string), where "%" corresponds to modulo operator.
Prefix of Golomb-Rice code=Symbol value/$2^K$=1→coded as 10 (a binary string).
Sign bit of Golomb-Rice code, where value "0" corresponds to a non-negative value.
Therefore, the Golomb-Rice code of symbol value 11 (decimal value) is: 10 011 0̸, where 10 is the prefix, 011 is suffix, and 0̸ is the sign bit.

A second example of Golomb-Rice coding is shown as follows:
Symbol value=0 (decimal value).
Suffix bit-depth K=4.
Suffix of Golomb-Rice code=Symbol value % $2^K$=0→coded as 0000 (a binary string).
Prefix of Golomb-Rice code=Symbol value/$2^K$=0→coded as 0 (decimal value).
Since the encoding symbol value is zero→no sign bit is required.
Therefore, the Golomb-Rice code of symbol value 0(decimal value) is
0 0000, where 0 is the prefix and 0000 is the suffix.

A third example of Golomb-Rice coding is shown as follows:
Symbol value=−25 (decimal value)
Suffix bit-depth K=3
Suffix of Golomb-Rice code=Symbol value % $2^K$=1→coded as 001 (a binary string).
Prefix of Golomb-Rice code=Symbol value/$2^K$=3→coded as 0001 (a binary string).
Sign bit of Golomb-Rice code, where value "0" corresponds to a non-negative value.
Therefore, the Golomb-Rice code of symbol value −25 (decimal value) is:
0001 001 0̸, where 0001 is the prefix, 001 is suffix, and 0̸ is the sign bit.

As mentioned before, when the maximum bit-depth coding is used, all symbols in the group are coded using fixed-length codes with a code length equal to the maximum bit-depth. A first example of the maximum bit-depth coding is shown as follows:
Symbol value=5 (decimal value)
Suffix bit-depth K=8
The maximum bit-depth code of symbol value 5 is:
00000101.

A second example of the maximum bit-depth coding is shown as follows:
Symbol value=−7 (decimal value)
Suffix bit-depth K=8
The maximum bit-depth code of symbol value −7 is:
11111001, which is a 2's complement representation for symbol value −7.

The present invention also discloses a second adaptive entropy coding technique, which determines a maximum bit-depth of a group of symbols and adaptively selects between Golomb-Rice coding and maximum bit-depth coding according to the maximum bit-depth of the group of symbols. In particular, if the maximum bit-depth of the group of symbols is smaller than a first bit-depth threshold, the group of symbols is coded using Golomb-Rice coding. If the maximum bit-depth of the group of symbols is greater than or equal to the first bit-depth threshold, the group of symbols is coded using maximum bit-depth coding. When the Golomb-Rice coding is selected, the Golomb-Rice coding process comprises coding a symbol into a prefix part and a suffix part with the bit-length of prefix part less than a second bit-depth threshold. When the maximum bit-depth coding is selected, the maximum bit-depth coding process comprises encoding all symbols within the group with suffix data at the maximum bit-depth of the group of symbols and no prefix data. The maximum bit-depth coding process further comprises encoding all symbols within the group with sign bit data if the symbol value is non-zero value.

The three examples of Golomb-Rice coding as shown before for the first adaptive entropy coding technique are also applicable for the second adaptive entropy coding technique.

A first example of the maximum bit-depth coding according to the second adaptive entropy coding technique is shown as follows:

Symbol value=5 (decimal value)
Suffix bit-depth K=7
The maximum bit-depth code of symbol value 5 is:
0000101☐, where ☐ represents the sign bit.
A second example of the maximum bit-depth coding according to the second adaptive entropy coding technique is shown as follows:
Symbol value=−7 (decimal value)
Suffix bit-depth K=8
The maximum bit-depth code of symbol value −7 is:
0000111☐, where ☐ represents the sign bit.

While the above two adaptive entropy coding techniques always select between the Golomb-Rice coding and the maximum bit-depth coding, the present invention is not limited to the maximum bit-depth coding when the maximum bit-depth of the group of symbols is greater than or equal to the first bit-depth threshold. Accordingly, the present invention also discloses a third adaptive entropy coding technique, which determines a maximum bit-depth of the group of symbols and adaptively selects between Golomb-Rice coding and second entropy coding according to the selected suffix bit-depth (K). In particular, if the maximum bit-depth of the group of symbols is smaller than a first bit-depth threshold, the group of symbols is coded using Golomb-Rice coding. If the maximum bit-depth of the group of symbols is greater than or equal to the first bit-depth threshold, the group of symbols is coded using the second entropy coding, where the second entropy coding is different from the Golomb-Rice coding. When the Golomb-Rice coding is selected, the Golomb-Rice coding process comprises coding a symbol into a prefix part and a suffix part with the bit-length of prefix part less than a second bit-depth threshold. The second entropy coding includes the maximum bit-depth coding.

The present invention may be applied to symbols generated from image and video coding. For example, the present invention can be applied to symbols of Advanced Display Stream Compression (ADSC). In the conventional ADSC approach, the maximum bit-depth of the group of symbols is determined for the group of symbols being coded. The binary representations of the group of symbols being coded are checks and the maximum bit-depth is determined accordingly. For example, if the group consists of four symbols with symbol values corresponding to {127, 5, 3, 11}, the maximum bit-depth of the group of symbols is 7 since the symbol value 127 needs 7 bits (i.e., '1111111') for its binary representation. In another example, if the group consists of four symbols with symbol values corresponding to {1, 1, 3, 4}, the maximum bit-depth of the group of symbols is 3 since the symbol value 4 needs 4 bits (i.e., '100') for its binary representation. The system also selects the first bit-depth threshold and compares the maximum bit-depth of the group of symbols with the first bit-depth threshold to determine whether to use Golomb-Rice coding or maximum bit-depth coding.

For example, if Golomb-Rice coding is used with suffix bit-depth equal to 3, a symbol value −26 will have a prefix value 3 (i.e., binary value 11) and a suffix value 2 (i.e., binary value 010). The prefix part is coded as three consecutive 1s followed by a stop bit "0". In other words, the prefix part is "1110". The suffix part is "010". Since the symbol value is negative, a sign bit "1" is used at the end. Accordingly, the Golomb-Rice code for this example is "1110|010|1", where notation "|" is used to illustrates the separate prefix, suffix and sign parts.

Figure 3:
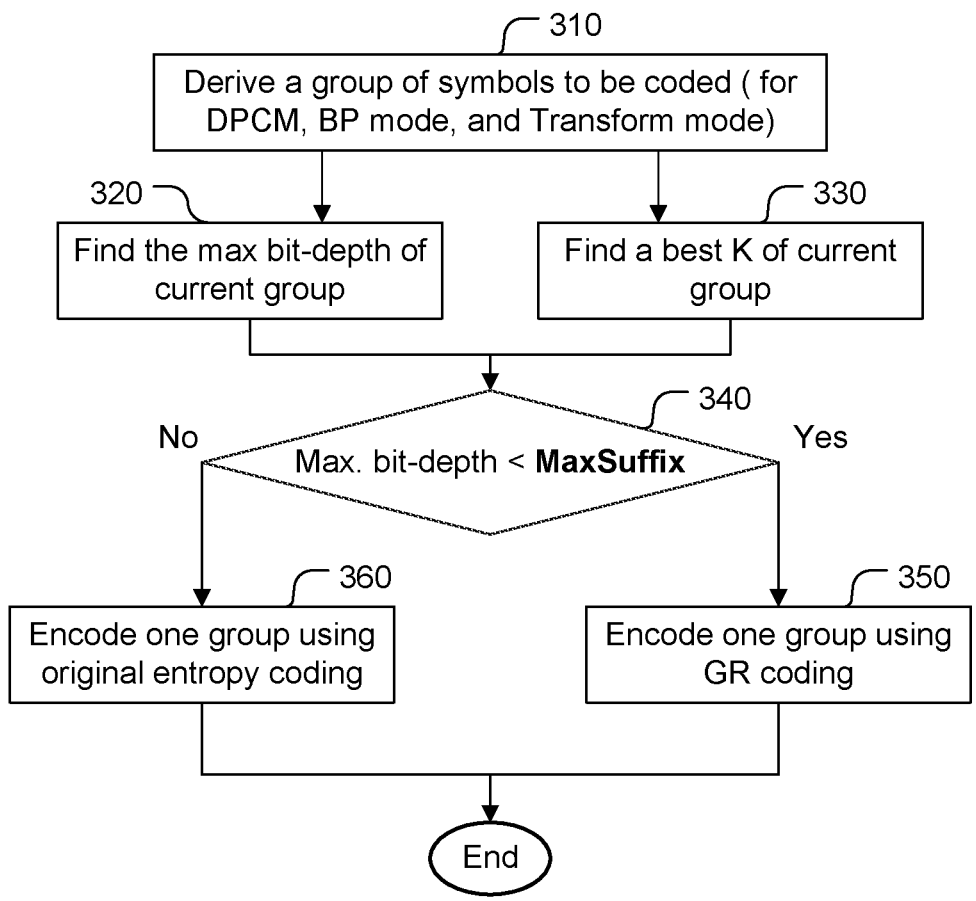
FIG. 3 illustrates an exemplary flowchart for a coding system incorporating adaptive Golomb-Rice entropy coding and conventional ADSC entropy coding (i.e., maximum bit-depth coding).

FIG. 3 illustrates an exemplary flowchart for a coding system incorporating adaptive Golomb-Rice entropy coding and conventional ADSC entropy coding (i.e., maximum bit-depth coding). In step 310, a group of symbols to be coded are derived, where the symbols may be associated with a block coded in the DPCM mode, BP mode, or transform mode. The maximum bit-depth of the group of symbols is determined in step 320. This step can be based on the conventional approach such as ADSC v0.51. On the other hand, a best suffix length (K) for Golomb-Rice coding of the current group is determined in step 330. The maximum bit-depth is compared with the first bit-depth threshold (i.e., MaxSuffix in this example) to determine whether the maximum bit-depth is smaller than the threshold (i.e., MaxSuffix) is checked in step 340. If the result of step 340 is "Yes", the group of symbols is coded using Golomb-Rice coding with K-bit suffix as shown in step 350. If the result of step 340 is "No", the group of symbols is coded using the original entropy coding (i.e., the maximum bit-depth coding) as shown in step 360.

Figure 4:
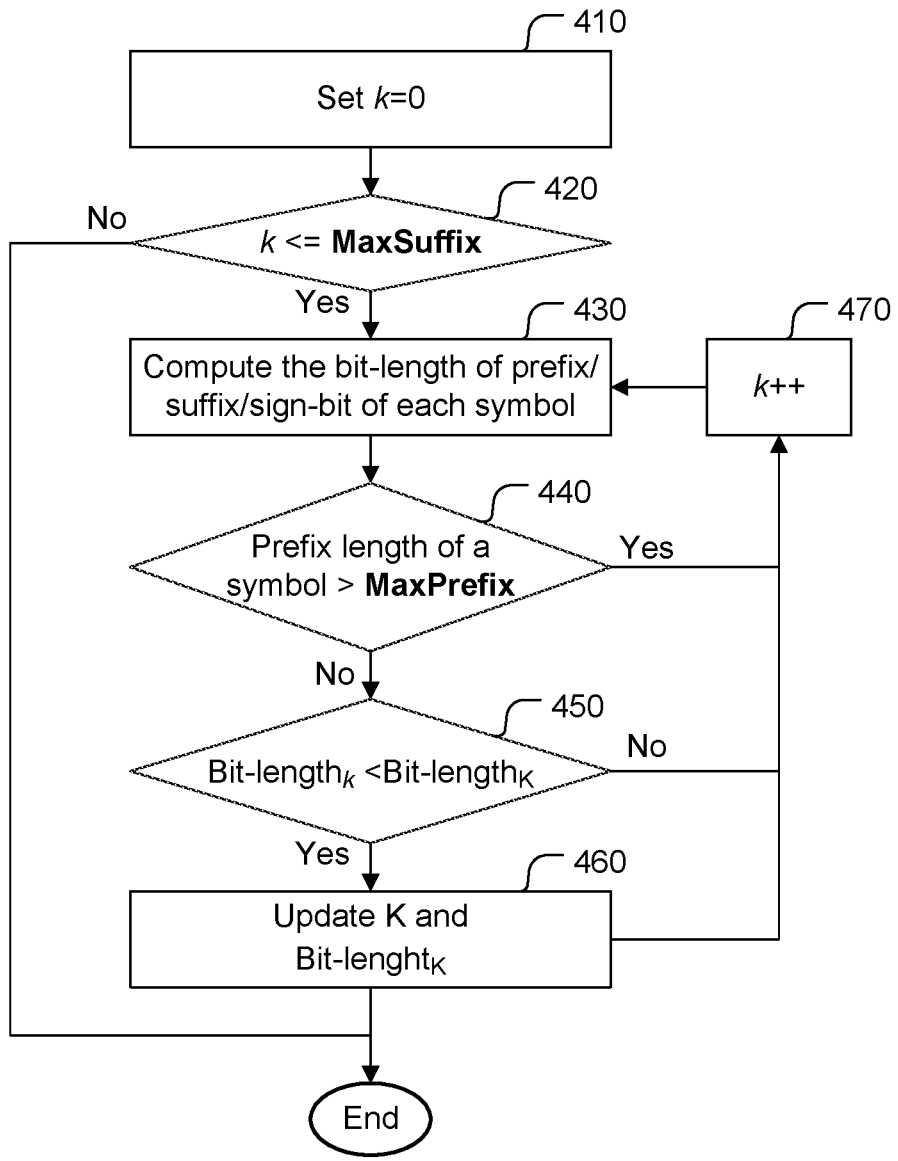
FIG. 4 illustrates an exemplary flowchart for deriving the BestK for the Golomb-Rice coding according to an embodiment of the present invention.

FIG. 4 illustrates an exemplary flowchart for deriving the best K of step 230 for the Golomb-Rice coding according to an embodiment of the present invention. The k value is initially set to 0 as shown in step 410. In step 420, whether k reached the limitation of suffix length (i.e., MaxSuffix) for the Golomb-Rice coding. If the result of step 420 is "Yes", the K derivation process is terminated. Otherwise (i.e., the "No" path of step 420), step 430 is performed, which computes the bit-length of prefix/suffix/sign-bit of each symbol. The prefix lengths of the symbols are checked against a prefix-length threshold (i.e., MaxPrefix) in step 440. If any prefix length of the symbol is greater than MaxPrefix (i.e., the "Yes" path from step 440), step 470 is performed to increment k by 1 (i.e., k++). Otherwise (i.e., the "No" path from step 440), step 450 is performed. In step 450, the bit length (Bit-length$_k$) for the current group coded using k as the suffix length of the Golomb-Rice coding is compared with the bit length (Bit-length$_K$) for the current group coded using K as the suffix length of the Golomb-Rice coding. If Bit-length$_k$ is smaller than Bit-length$_K$ (i.e., the "Yes" path of step 450), the K and Bit-length$_K$ are updated with k and Bit-length$_k$ respectively as shown in step 460. Otherwise (i.e., the "No" path of step 450), k is incremented in step 470. After k is incremented, the process is iterated by going to step 430.

In FIG. 4, the best K is derived to optimize the coding performance of the Golomb-Rice coding. In the example of FIG. 4, there are two limitations (i.e., MaxPrefix and MaxSuffix) for the constraining the difference of maximum codeword size and minimum codeword size in Golomb-Rice coding. The two parameters can be signaled in high-level syntax such as PPS (picture parameter set). The complexity of hardware implementation of adaptive entropy coding based on the present invention can be made scalable. For example, the corresponding decoder may determine the computational complexity based on the two parameters signaled in the PPS to allocate or adjust required computational resources accordingly. The computational complexity is also dependent on the type of processing applied to the underlying data and the clock rate of the hardware. The adaptive entropy coding disclosed above can be forced to use the non-Golomb-Rice coding (i.e., turning off the Golomb-Rice) by setting MaxSuffix to 0.

As mentioned above, the two parameters MaxPrefix and MaxSuffix can be used to control the coding complexity of the adaptive entropy coding. Table 1 illustrates an example of adaptive entropy coding according to one embodiment of the present invention, where Suffix is set to 4. The prefix parts and suffix parts for different symbol values are listed, where the maximum length of the prefix codes is 8 (i.e., "11111110" for symbol value equal to 127). If MaxPrefix is set to be 8, the GR codes generated in Table 1 are all valid since none of the prefix codes exceeds a bit length of 8. However, if the MaxPrefix is set to be 4, the GR codes generated in Table 1 are invalid since the prefix code for symbol value equal to 127 exceeds the bit length of 4. As is known in the field, longer variable codes result in higher complexity. Therefore, the parameter corresponding to Max-Prefix equal to 8 result in valid codes. However, the system incurs higher complexity. On the other hand, the parameter corresponding to MaxPrefix results in lower complexity. However, it results in invalid codes.

TABLE 1

| Suffix = 4 | Value | Prefix | Suffix |
|---|---|---|---|
| Symbol 1 | 127 | 11111110 | 1111 |
| Symbol 2 | 5 | 0 | 101 |
| Symbol 3 | 3 | 0 | 11 |
| Symbol 4 | 11 | 0 | 1011 |

Table 2 illustrates another example of adaptive entropy coding according to an embodiment of the present invention, where Suffix is set to 5. The prefix parts and suffix parts for different symbol values are listed, where the maximum length of the prefix codes is 4 (i.e., "1110" for symbol value equal to 127). If MaxPrefix is set to be 8, the GR codes generated in Table 2 are all valid since none of the prefix codes exceeds a bit length of 8. Also, if the MaxPrefix is set to be 4, the GR codes generated in Table 2 are still invalid since the prefix code for symbol value equal to 127 has a bit length equal to 4. Therefore, the example in Table 2 is a good choice, which results in valid codes and also keeps the complexity low.

TABLE 2

| Suffix = 5 | Value | Prefix | Suffix |
|---|---|---|---|
| Symbol 1 | 127 | 1110 | 11111 |
| Symbol 2 | 5 | 0 | 101 |
| Symbol 3 | 3 | 0 | 11 |
| Symbol 4 | 11 | 0 | 1011 |

Figure 5:
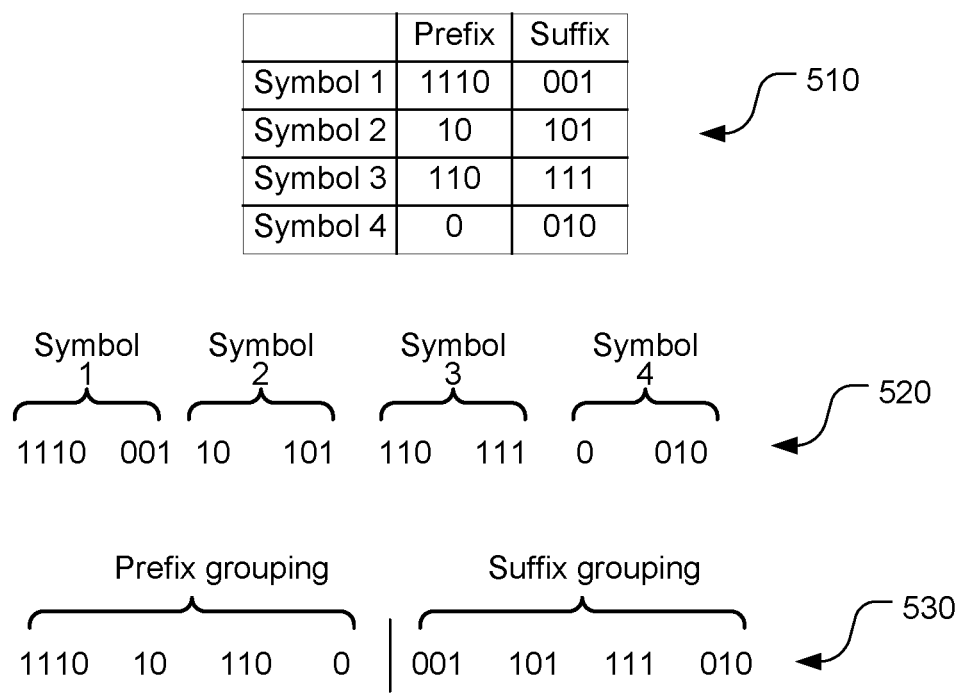
FIG. 5 illustrates examples of bit stream transmission formats for the output of Golomb-Rice coding.

As shown in the above example, the coding complexity can be reduced by limiting the maximum allowable prefix length. The generated Golomb-Rice codes can be transmitted one by one according to the order of the symbols. According to this method, the prefix parts and the suffix parts associated with the symbols will be transmitted in an interleaved fashion. Alternatively, the prefix parts and the suffix parts can be grouped separated. FIG. 5 illustrates examples of bit stream transmission formats. The Golomb-Rice codes (510) for 5 symbols are listed. Bit stream 520 corresponds to the stream format with interleaved prefix part and suffix part. Bit stream 530 corresponds to the stream format with prefix parts grouped and suffix parts grouped separately.

Figure 6:
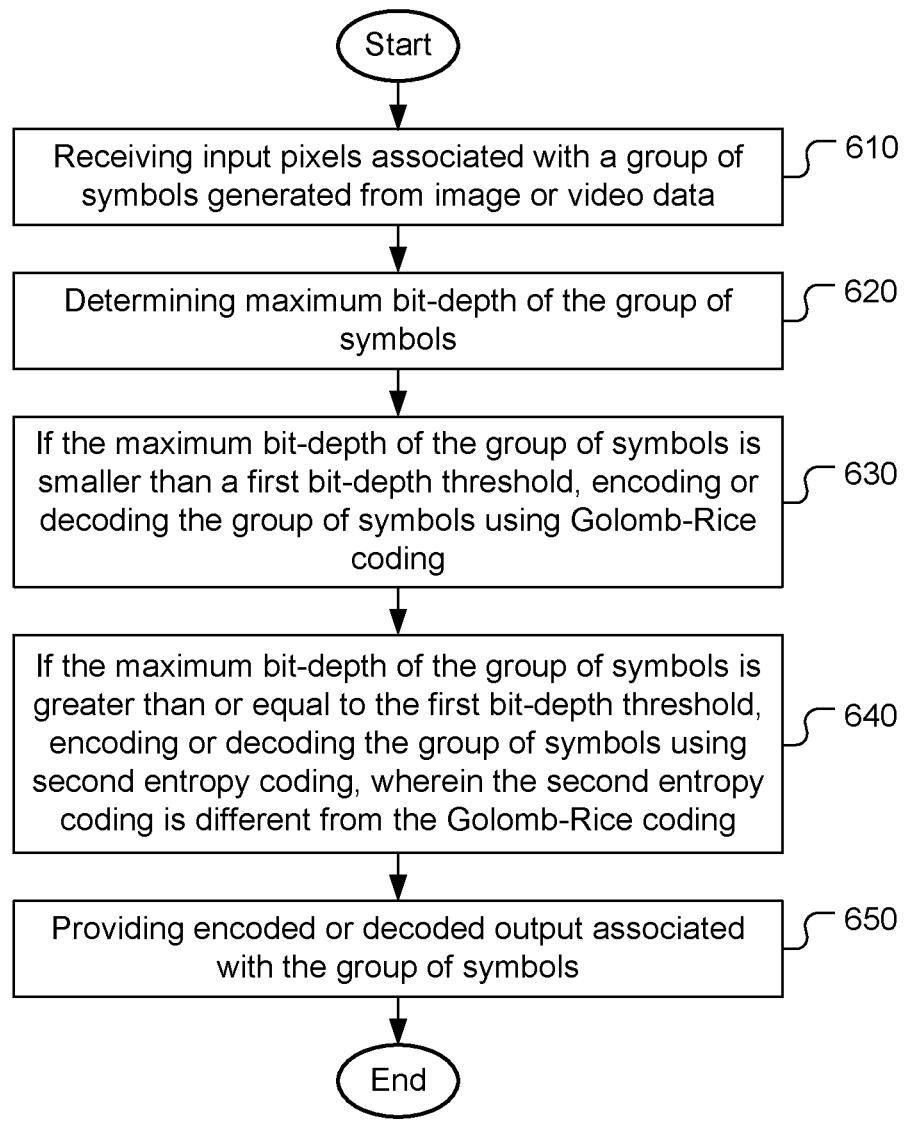
FIG. 6 illustrates a flowchart for exemplary adaptive entropy coding incorporating an embodiment of the present invention.

FIG. 6 illustrates a flowchart for exemplary adaptive entropy coding incorporating an embodiment of the present invention. The method shown in FIG. 6 may be employed by the entropy coding unit 216 shown in FIG. 2A. The method receives input pixels associated with a group of symbols generated from image or video data in step 610. At the encoder side, the input data correspond to the symbols generated by the coding process and the symbols are subject to entropy coding to generate bit streams. For example, the symbols correspond to the symbols associated with DPCM, BP mode or transform mode that are to be entropy coded. Taking the ADSC encoder shown in FIG. 2A as an example, the entropy coding unit 216 receives input pixels associated with a group of symbols generated from image or video data. At the decoder side, the input data correspond to binary strings to be entropy decoded to recover the corresponding symbols, which correspond to the symbols associated with DPCM, BP mode or transform mode that are to be entropy coded. A maximum bit-depth of the group of symbols is determined in step 620. For example, at the encoder side, an entropy encoder such as the entropy coding unit 216 shown in FIG. 2A determines a maximum bit-depth of the group of symbols. As mentioned before, the present invention adaptively selects Golomb-Rice coding or other entropy coding according to the maximum bit-depth of the group of symbols. If the maximum bit-depth of the group of symbols is smaller than a first bit-depth threshold, the group of symbols is encoded or decoded using Golomb-Rice coding in step 630. If the maximum bit-depth of the group of symbols is greater than or equal to the first bit-depth threshold, the group of symbols is encoded or decoded using second entropy coding (i.e., other entropy coding) in step 640, where the second entropy coding is different from the Golomb-Rice coding. As mentioned previously, at an encoder side, step 630 and step 640 is further executed after step 620 an entropy encoder by such as the entropy coding unit 216 shown in FIG. 2A. Similarly, at decoder side, a entropy decoder further execute step 630 and step 640 to adaptively selects Golomb-Rice coding or other entropy coding according to the maximum bit-depth of the group of symbols. The encoded or decoded output associated with the group of symbols is then provided in step 650.

The flowchart shown above is intended to illustrate an example of image coding incorporating an embodiment of the present invention. A person skilled in the art may modify each step, re-arrange the steps, split a step, or combine the steps to practice the present invention without departing from the spirit of the present invention.

The flowchart may correspond to software program codes to be executed on a computer, a mobile device, a digital signal processor or a programmable device for the disclosed invention. The program codes may be written in various programming languages such as C++. The flowchart may also correspond to hardware based implementation, where one or more electronic circuits (e.g. ASIC (application specific integrated circuits) and FPGA (field programmable gate array)) or processors (e.g. DSP (digital signal processor)).

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be a circuit integrated into an image compression chip or program code integrated into image compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of entropy coding for a group of symbols to be performed at an encoder or a decoder, the method comprising:
   receiving input pixels associated with a group of symbols generated from image or video data;
   determining maximum bit-depth of the group of symbols;
   if the maximum bit-depth of the group of symbols is smaller than a first bit-depth threshold, encoding or decoding the group of symbols using Golomb-Rice coding;
   if the maximum bit-depth of the group of symbols is greater than or equal to the first bit-depth threshold, encoding or decoding the group of symbols using second entropy coding, wherein the second entropy coding is different from the Golomb-Rice coding; and
   providing encoded or decoded output associated with the group of symbols.

2. The method of claim 1, wherein the maximum bit-depth of the group of symbols is signaled at the encoder or parsed at the decoder.

3. The method of claim 1, wherein the Golomb-Rice coding encodes a given symbol into a prefix part and a suffix part at the encoder or decodes the prefix part and the suffix part into the given symbol at the decoder, and wherein the suffix part consists of K bits and K is an integer greater than or equal to zero.

4. The method of claim 3, wherein prefix bit-length of the prefix part is smaller than or equal to a second bit-depth threshold.

5. The method of claim 4, wherein information related to the first bit-depth threshold and the second bit-depth threshold are signaled in high-level syntax of a bitstream related to the group of symbols.

6. The method of claim 5, wherein the high-level syntax corresponds to PPS (Picture Parameter Set).

7. The method of claim 4, wherein the second bit-depth threshold corresponds to a maximum allowed Prefix bit-length.

8. The method of claim 4, wherein a smaller second bit-depth threshold is selected at the encoder to reduce coding complexity.

9. The method of claim 3, wherein parameter K is determined at the encoder using an optimization process to select a best parameter K to achieve minimum coded bit-length for the group of symbols and the best parameter K is constrained to be smaller than or equal to the first bit-depth threshold.

10. The method of claim 3, wherein the Golomb-Rice coding uses a sign bit in addition to the prefix part and the suffix part for signed symbols.

11. The method of claim 3, wherein when the Golomb-Rice coding is used, prefix parts and suffix parts for the group of symbols are concatenated into a bitstream, wherein the prefix parts and the suffix parts for the group of symbols are interleaved in a bitstream.

12. The method of claim 3, wherein when the Golomb-Rice coding is used, prefix parts for the group of symbols and suffix parts for the group of symbols are grouped separately into a bitstream.

13. The method of claim 1, wherein the second entropy coding corresponds to maximum bit-length coding, wherein the maximum bit-length coding encodes a given symbol into a suffix data at the maximum bit-length without prefix data or decodes the suffix data at the maximum bit-length without the prefix data into the given symbol.

14. The method of claim 13, wherein the maximum bit-length coding represents a positive symbol value of the given symbol as a binary number having the maximum bit-length.

15. The method of claim 13, wherein the maximum bit-length coding represents a negative symbol value of the given symbol as a 2's complement binary number having the maximum bit-length.

16. The method of claim 1, wherein the first bit-depth threshold is set to zero to force the group of symbols to be coded using the second entropy coding.

17. An apparatus for entropy coding applied to a group of symbols in an encoder or a decoder, the apparatus comprising one or more electronic circuits or processor arranged to:
   receive input pixels associated with a group of symbols generated from image or video data;
   determine maximum bit-depth of the group of symbols;
   if the maximum bit-depth of the group of symbols is smaller than a first bit-depth threshold, encode or decode the group of symbols using Golomb-Rice coding;
   if the maximum bit-depth of the group of symbols is greater than or equal to the first bit-depth threshold, encode or decode the group of symbols using second entropy coding, wherein the second entropy coding is different from the Golomb-Rice coding; and
   provide encoded or decoded output associated with the group of symbols.

18. The apparatus of claim 17, wherein the Golomb-Rice coding encodes a given symbol into a prefix part and a suffix part or decodes the prefix part and the suffix part into the given symbol.

19. The apparatus of claim 18, wherein prefix bit-length of the prefix part is smaller than or equal to a second bit-depth threshold.

20. The apparatus of claim 19, wherein the second bit-depth threshold corresponds to a maximum allowed Prefix bit-length.

21. The apparatus of claim 19, wherein a smaller second bit-depth threshold is selected at the encoder to reduce coding complexity.

22. The apparatus of claim 19, wherein the first bit-depth threshold and the second bit-depth threshold are used at the decoder to determine required processing complexity.

23. The apparatus of claim 17, wherein the second entropy coding corresponds to maximum bit-length coding, wherein the maximum bit-length coding encodes a given symbol into a suffix data at the maximum bit-length without prefix data or decodes the suffix data at the maximum bit-length without the prefix data into the given symbol.

24. The apparatus of claim 23, wherein the maximum bit-length coding represents a positive symbol value of the given symbol as a binary number having the maximum bit-length.

25. The apparatus of claim 23, wherein the maximum bit-length coding represents a negative symbol value of the given symbol as a 2's complement binary number having the maximum bit-length.

\* \* \* \* \*